US012792633B2

(12) United States Patent
Binnal et al.

(10) Patent No.: US 12,792,633 B2
(45) Date of Patent: *Nov. 10, 2026

(54) ACTIVE MANAGEMENT OF FILES BEING PROCESSED IN ENTERPRISE DATA WAREHOUSES UTILIZING TIME SERIES PREDICTIONS

(71) Applicant: Cerner Innovation, Inc., Kansas City, MO (US)

(72) Inventors: Wasimakram Binnal, Bengaluru (IN); Karthik Kolar Nagaraja, Bengaluru (IN); Pradeep Revanna Premakumar, Bengaluru (IN)

(73) Assignee: Cerner Innovation, Inc., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/816,654

(22) Filed: Aug. 27, 2024

(65) Prior Publication Data

US 2024/0419689 A1 Dec. 19, 2024

Related U.S. Application Data

(63) Continuation of application No. 18/102,901, filed on Jan. 30, 2023, now Pat. No. 12,111,848.

(51) Int. Cl.

*G06F 16/28* (2019.01)
*G06F 16/21* (2019.01)
*H04L 67/10* (2022.01)

(52) U.S. Cl.

CPC .......... *G06F 16/283* (2019.01); *G06F 16/219* (2019.01); *H04L 67/10* (2013.01)

(58) Field of Classification Search

CPC .................................................... G06F 16/283
See application file for complete search history.

(56) References Cited

U.S. PATENT DOCUMENTS 8,682,816 B2 3/2014 Ruhl et al.
9,367,803 B2 6/2016 Yadav et al.
(Continued)

FOREIGN PATENT DOCUMENTS

GB 2465861 6/2010
KR 101919076 11/2018

OTHER PUBLICATIONS

U.S. Appl. No. 18/102,901 , "Notice of Allowance", Jul. 12, 2024, 11 pages.

*Primary Examiner* — Mohammad S Rostami
(74) *Attorney, Agent, or Firm* — Kilpatrick Townsend & Stockton LLP

(57) ABSTRACT

Techniques are provided for determining a delay in a data process flow at an enterprise data warehouse. An example method generating a feature for a machine learning model to use to forecast a time interval between receipt of first data at a staging area of a data warehouse and receipt of the first data at a target database of the data warehouse based at least in part on second data received from the staging area and third data received from the target database. The method can further include generating, using the machine learning model, a forecasted time interval based at least in part on the feature. The method can further include comparing the forecasted time interval with an expected time interval for fourth data received at the staging area. The method can further include updating a priority of the first data based at least in part on the comparison. The method can further include transmitting the first data to the target database based at least in part on the updated priority.

17 Claims, 11 Drawing Sheets

(56) References Cited

U.S. PATENT DOCUMENTS

| | | | |
|---|---|---|---|
| 9,418,339 B1 | 8/2016 | Leonard et al. | |
| 9,479,447 B2 | 10/2016 | Samuels et al. | |
| 10,275,301 B2 | 4/2019 | Cherbakov et al. | |
| 10,708,331 B1 * | 7/2020 | Joliveau | H04L 65/613 |
| 2013/0103657 A1 | 4/2013 | Ikawa et al. | |
| 2015/0164430 A1 * | 6/2015 | Hu | A61B 5/681<br>600/595 |
| 2018/0326982 A1 * | 11/2018 | Paris | B60W 30/0956 |
| 2019/0265971 A1 * | 8/2019 | Behzadi | H04L 67/61 |
| 2020/0257992 A1 | 8/2020 | Achin et al. | |
| 2021/0192641 A1 * | 6/2021 | Das | G06Q 40/02 |
| 2021/0241175 A1 * | 8/2021 | Harang | G06F 18/214 |
| 2021/0335470 A1 | 10/2021 | Nambirajan et al. | |
| 2021/0406084 A1 * | 12/2021 | Reineke | G06F 11/1451 |
| 2021/0406916 A1 | 12/2021 | Zhai | |
| 2022/0038351 A1 * | 2/2022 | Jasionowski | H04L 41/5019 |
| 2022/0092442 A1 | 3/2022 | Sefair Cristancho et al. | |
| 2022/0318613 A1 * | 10/2022 | Nambirajan | G06N 3/045 |
| 2022/0327404 A1 * | 10/2022 | Godden | G06N 20/00 |
| 2022/0350704 A1 * | 11/2022 | Ehsan | G06F 16/254 |
| 2023/0060869 A1 * | 3/2023 | Harris | G06Q 20/4016 |
| 2023/0153681 A1 * | 5/2023 | Kyanam | G06N 5/01<br>706/12 |
| 2023/0370681 A1 * | 11/2023 | Welch | H04N 21/4431 |
| 2023/0376202 A1 * | 11/2023 | Wang | G06F 3/0673 |
| 2024/0012795 A1 * | 1/2024 | Kandasamy | G06F 16/217 |
| 2024/0070594 A1 * | 2/2024 | Grover | G06Q 10/06395 |
| 2024/0193137 A1 * | 6/2024 | Eunice | G06Q 40/08 |
| 2024/0193627 A1 * | 6/2024 | Sanchez | G06Q 10/083 |
| 2024/0195787 A1 * | 6/2024 | Kairali | H04L 63/105 |
| 2024/0205115 A1 * | 6/2024 | Palanisamy | H04L 43/026 |
| 2025/0139997 A1 * | 5/2025 | Cheng | G06V 20/625 |

* cited by examiner

400

| Parameter Name 402 | Description 404 | ML Model outcome 406 | Analysis 408 | Decision 410 |
|---|---|---|---|---|
| Specified_days | Specified days agreed with clients | Delay expected | If ML delay and within specified days | Don't raise ticket |
| Delay_weekly | Comparing weekly average delay per source vs average client delay | Delay expected | AS delay weekly is > then client average + ML delay | Raise ticket |
| Highest delay in sources | Comparing highest delay with client with each source | No delay | if high delay within client sources | Don't raise ticket |
| Sigma weekly delay | Comparing > 70% percentile of delay vs highest weekly delay within client | Delay expected | if delay falls within high region of delay for a particular source within a client for a week | Raise ticket |
| No_Sigma_weekly delay | Comparing <35% percentile delay vs average weekly delay within a client | Delay expected | if delay falls within low region of delay for a particular source within a client for a week | Raise ticket |
| Sigma monthy delay | Comparing > 70% percentile of delay vs highest monthly delay within client | Delay expected | if delay falls within high region of delay for a particular source within a client for a month | Raise ticket |
| No_Sigma_monthly delay | Comparing <35% percetile delay vs average monthly delay within a client | Delay expected | if delay falls within low region of delay for a particular source within a client for a month | Raise ticket |
| Clients_delay_weekly 412 | Comparing average delays between clients 414 | No delay 416 | if average delays for a client below weekly average of all other client | Don't raise ticket 418 |
| Clients_delay_monthly | Comparing average monthly delays between clients | No delay | if average delays for a client below monthly average of all other cleint | Don't raise ticket |
| Highest_client_weeklydelay | Comparing source delay with average weekly highest cleint delay | No delay | if average delay of a source is less than hughest weekly average of a client | Don't raise ticket |

FIG. 4

500

| Date | Model accuracy confidence | Forecasted delay | Source 1 Confidence | percentile |
|---|---|---|---|---|
| January 1st | 0.95 | 1 | 0.94 | 0.855 |
| January 2nd | 0.96 | 2 | 0.85 | 0.864 |

FIG. 5

ACTIVE MANAGEMENT OF FILES BEING PROCESSED IN ENTERPRISE DATA WAREHOUSES UTILIZING TIME SERIES PREDICTIONS

CROSS-REFERENCES TO RELATED APPLICATIONS

This application is a continuation of U.S. application Ser. No. 18/102,901, filed Jan. 30, 2023; the disclosure of which is hereby incorporated by reference in its entirety for all purposes.

BACKGROUND

A cloud service provider (CSP) can provide multiple cloud services to subscribing customers. These services are provided under different models, including a Software-as-a-Service (SaaS) model, a Platform-as-a-Service (PaaS) model, an Infrastructure-as-a-Service (IaaS) model, and others.

BRIEF SUMMARY

Various embodiments are described herein, including computer-implemented methods, systems, non-transitory computer-readable media storing programs, code, or instructions executable by one or more processors, and the like. Some embodiments may be implemented by using a computer program product, comprising program/instructions which, when executed by a processor, cause the processor to perform any of the methods described in the disclosure.

Embodiments herein are directed toward techniques for training an inter type augmented model, wherein a technique can include, for example, a method, a computing system, or one or more computer readable media. An example method can include identifying a custom class generating a feature for a machine learning model to use to forecast a time interval between receipt of first data at a staging area of a data warehouse and receipt of the first data at a target database of the data warehouse based at least in part on second data received from the staging area and third data received from the target database.

The method can further include generating using the machine learning model, a forecasted time interval based at least in part on the feature.

The method can further include comparing the forecasted time interval with an expected time interval for fourth data received at the staging area.

The method can further include updating a priority of the first data based at least in part on the comparison.

The method can further include transmitting the first data to the target database based at least in part on the updated priority.

BRIEF DESCRIPTION OF THE DRAWINGS

FIG. 4 is an illustration of features generated by a feature generation unit, according to one or more embodiments.

FIG. 5 is an illustration of a confidence metric for a data flow process, according to one or more embodiments.

DETAILED DESCRIPTION

Figure 1:
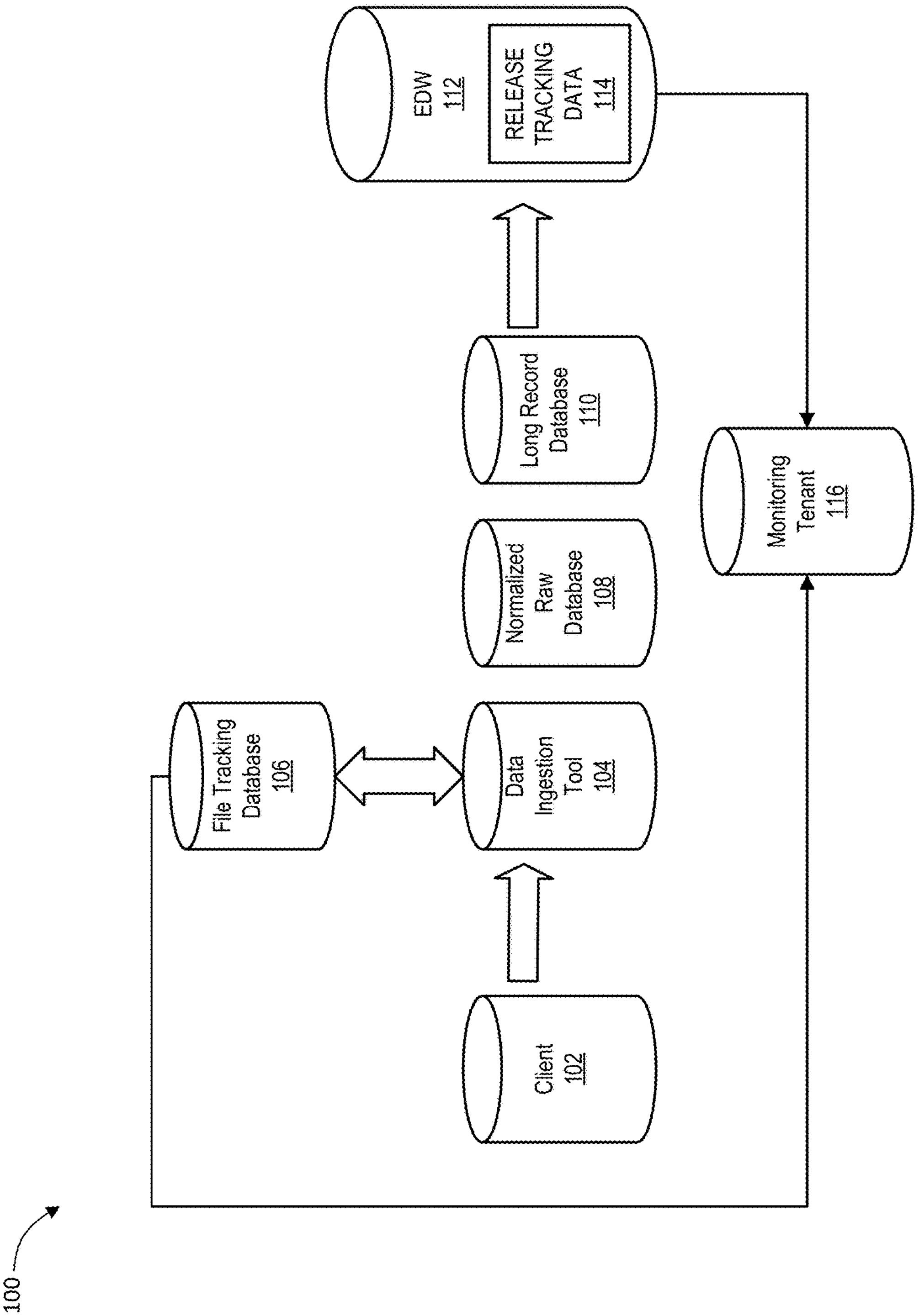
FIG. 1 is an illustration of a data flow process for an enterprise data warehouse (EDW), according to one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Cloud service providers (CSPs) can use an enterprise data warehouse (EDW) to manage data from multiple data sources. An EDW can include a staging area for aggregating the files from the different sources and cleaning the data. The EDW can further include an access point for services to extract the datasets from the files for analytics and sharing. The EDW can further include data integration tools or application programming interfaces (APIs) that allow a service to access the datasets stored in various formats. The files can be received by the EDW from multiple clients, or multiple sources of a single client. For example, a client that is a large enterprise can provide data from different sources within the enterprise. The files can include, for example, claims, enrollment, personal details, etc. These files are typically unstructured in nature when received and are processed to make them ready for downstream analytics consumption. The files can be tracked throughout the data flow ecosystem of the EDW.

The files that are uploaded by clients to the EDW and move downstream through the data process flow can contain metadata describing different attributes of the files, "viz.," "client name," "client schema," "source id," "data set id," "file type," "spec-version," "file receive date," "date in edw," etc. One or more metadata items can be used to track the files and determine a processing stage for the files. The current process of monitoring the files can involve manually checking a dashboard, which shows the current status of the files. Each file that enters the data flow ecosystem can expect some delay from being received, getting processing, and landing in an EDW (e.g., target database). In some instances, processing a file can be delayed for greater than an expected delay. Under the current process, an EDW operator can manually monitor the files to determine a length of time between being received and landing in an EDW. Files that do not reach the EDW after three days from the file receive date can be marked as "Not Processed." An EDW operator typically can wait an additional day before notifying an EDW monitoring team dedicated to looking into such "Not Processed" files and investigating the cause. Therefore, in addition to the standard three day expected delay, a current practice is to wait an additional day before notifying an EDW monitoring team.

Embodiments described herein address the above-referenced issues by providing techniques for a machine learning-based forecasting system that provides a forecast of the latency in the data, (e.g., forecasting the delay in the flow of the data). The embodiments provide a measure for proactive monitoring of the data flow within the data flow ecosystem and reducing the time delay between receiving a file and alerting a monitoring team of a "Not Processed" file.

The embodiments describe a system that can use a machine learning model analyze historical data from a data processing flow of the EDW. The model can further generate an output that includes a forecasted delay of a new file between two points of the data process flow. The two points can include the data ingestion tool (DIT) (e.g., the source), and the EDW (e.g., the destination). The new file can be a file received at the staging area and waiting to be processed. The new file can also be a file to be received at the staging area for processing. In this sense, the customer can be informed of potential delays of files transmitted to the staging area or to be transmitted to the staging area. The system can further compare the forecasted delay to an expected delay (e.g., a threshold delay). If the forecasted delay is greater than the expected delay, the system can proactively contact an EDW monitoring team. Therefore, the system can notify the EDW monitoring team prior to the new file remining in the data process flow for the full term of the expected delay. As a result, the client can expect that their file can be received by the system, processed and land at the target database within the expected delay.

The embodiments are built at a source-level granularity, such that data can be retrieved from multiple sources for each client and generate a latency prediction of each source of each client. In some instances, this results in making predictions of more than one thousand time series at once, within a few minutes by a computing device, such as a server. The predicted latency in the files can then be used strategically to monitor using a dynamic threshold, or a forecasted date for new files to reach the destination. This can lead to proactive monitoring for newly received files each client at the source level. The new files that are forecasted to have high delays can be noted by the monitoring team to log service requests to be resolved by the respective teams. The embodiments described herein enable proactive monitoring, detection, and resolution of new file latency, without interfering with the current standardized process flow of an EDW.

FIG. 1 is an illustration of a system 100 for a data flow process of an enterprise data warehouse (EDW), according to one or more embodiments. A client 102 can provide and transmit files to a data ingestion tool 104 of an EDW. The data ingestion tool 104 can be implemented by a computing device and include software for receiving data from one or more clients and storing the data in a database. The data can be streamed from multiple sources of the client 102, to the data ingestion tool 104 in either real-time streaming or in batches. For example, consider a large healthcare company that operates multiple hospital chains. Each hospital chain can be a data source. The data ingestion tool 104 can prioritize the received data and transform the data to a standardized format to be amenable for storage and/or analysis.

The system 100 can include a staging area, which can be an intermediate storage area for processing data received from a client 102. The staging area can include, for example, a data ingestion tool 104, a normalized raw database 108, and a long record database 110. The system 100 can further include an enterprise data warehouse (EDW) 112, which can include a target database for storing the processed data loaded on from the staging area. The data stored at the EDW 112 can be organized into metadata, summary data, and raw data. The system 100 can be implemented by one or more servers of a cloud infrastructure.

The system can store file tracking data in a file tracking database 106. Each file that is received from the client 102 and by the data ingestion tool 104 can be time-stamped at the data ingestion tool 104. A file identifier, a client identifier, and the time stamp can be logged into the file tracking database 106. The time stamp can be used to determine the latency between file being received by the data ingestion tool 104 and landing in the EDW 112.

The process of making the files amenable for storage and/or analytics can include data normalization. The EDW 112 can include a structured target database, and files stored at the structured target database can have a standardized structure. Data normalization can include scrubbing, reorganizing, and reformat the files to be amenable to the structure of the EDW 112. The normalized files can be stored in a normalized raw database 108. When the normalized files are ready to be transmitted, the data can be transmitted to a long record database 110, which can store the files prior to transmission. The normalized files can be transmitted from the long record database 110 to the EDW 112. The EDW 112 can collect release tracking data 114, for example, a time stamp of when the normalized files land at the EDW 112 from the long record database 110, a file identifier, and a client identifier.

It should be appreciated that a delay between the file being received at the data ingestion tool 104 and landing at the EDW 112 can occur during standardization. For example, a client may provide data in a table format, but without column headers. The absence of a column header can prevent data from being standardized, and therefore the delay can extend beyond an expected delay. Another issue that can occur is the files are being transmitted in batches, and one or more batches are corrupted. Another issue can be that the client's server is down.

The data from the file tracking database 106 and the release tracking data 114 from the EDW 112 can be transmitted to a monitoring tenant 116, which can also transmit the file tracking database 106 to the EDW 112. The system 100 can compare the time stamp, client identifier, and file identifier stored at the file tracking database 106 with the time stamp, client identifier, and file identifier stored at the EDW 112 to determine whether the client identifiers and file identifiers are the same. In some instances, the data from the file tracking database 106 and the EDW 112 can be stored using a truncate and load strategy, in which the file tracking data previously received from the file tracking database 106 and the EDW 112 is erased, and the new data is loaded for each cycle. For example, each day the file tracking data previously received from the file tracking database 106 and the EDW 112 is erased in the morning and allowed to accumulate for the rest of the day until it is erased the next day.

The system 100 can include a model, such as a machine learning model, for forecasting a delay for each client, including the client 102, between data being received at the data ingestion tool 104 and landing at the EDW 112. The system 100 (e.g., using a feature generation unit) can generate features from historical data retrieved from the data flow process. For example, the features can be generated from a past six months of data collected at the data ingestion tool 104 and the EDW 112. The features can be generated using mathematical and statistical functions, such as date features, window features, cumulative features, delay features, binary, and a moving average process. The date features can include, for example, day, day of the week, month, beginning or end of the month, year weekday/weekend, and quarter. The window features can include, for example, a rolling mean, a rolling min and max, rolling standard deviation, and upper and lower Bollinger Bands. The cumulative features can include, for example, a cumulative sum, and cumulative sum per week. The delay features can include a lag on day, a lag on week, a lag on month, a lag on quarter, and the differences of these lagged features and the original delay column (e.g., the expected delay specified between the client and the EDW operator). The binary features can include, for example, features based on the window features and generated by comparing with the values of the original delay column. The moving average {MA(q)} process MA(q) (q=1) can be included, for example, by adding noise to an average over a long-term window.

The model can include a regression model, such as a random forest regressor model. A random forest regressor model can be a classifier that uses decision trees to generate forecasts. The random forest regressor model can be used to add stability to the model. For example, by using a random forests technique, one feature does not become overly influential over the other features in the forecasted delays. The model can implement a recursive forecasting scheme to forecast h-time points into the future, where h is a forecasting horizon. The model can be trained using different time series and using different client data.

The model can be trained and tested at a desired frequency. For example, the EDW 112 can receive a new batch of historical data on a daily basis. The system 100 can further use the historical data to generate inputs for the model and train the model each day. The system 100 can further determine an accuracy and a confidence score for the determined accuracy each day.

The model can be trained using supervised learning techniques, such as by using an 80:20 split of the historical data. In other words, the model can receive as training data, a time series including data points indicating delays for a client. The time series can be split using an 80:20 split, where the 80% of the data points include the oldest data points of the time series and the 20% of the data points include the youngest data points of the time series. The oldest data points of the time series can be used to forecast values for future data points and the youngest data points can be used to validate the forecasted values. The model's accuracy can be evaluated using a root mean squared error (RMSE) metrics and the mean absolute percentage error (MAPE) metrics. The accuracy can further be used to generate a confidence score for evaluating the accuracy.

The output of the model can include, for each client, a forecasted delay between a file being received at the data ingestion tool 104 and landing at the EDW 112. The output can be implemented into the data flow process through various strategies, including a dynamic threshold, proactive monitoring using a forecasted delay, and proactive monitoring at the client level. The model can output the average forecasted delay for new files received from all the sources of a client, which can be set as dynamic thresholds that are updated daily or weekly as required. Note, this threshold is dynamic over both time and client, thus providing an improvement over thresholds that are based on human intuition, which are static over both client and time.

The forecasted delay, when added with the file receive date, provides a date when a new file is expected to reach the EDW 112. The forecasted delay can be compared to an expected delay to determine whether the monitoring team should be notified. For example, the client 102 and the EDW operator can agree on an expected delay (e.g., three days). If the forecasted delay of the new file is greater than the expected delay, the system 100 can generate a work ticket to notify the monitoring team. If the forecasted delay for the new file is less than or equal to the expected delay, the system 100 can elect to not generate a work ticket. This provides an EDW monitoring team time to proactively monitor and catch files forecasted to be delayed prior to the expiration of the expected delay. It also includes a provision to detect missing files by comparing the count of files on the file receive date at the data ingestion tool 104 and forecasted landing date at EDW 112.

The average forecasted delay per client can also be used to prioritize clients with relatively larger delay for active monitoring and reduction of delay. It should be appreciated that the dynamic thresholds and the forecasted dates for the new files to reach the EDW 112 are predicted, inputted, and updated automatically into the dashboard for the implementation of the herein-described strategies. The dashboard addresses all the needs and specifications of the end-users. Therefore, the whole process can produce a synergistic approach of proactive monitoring where different monitoring teams can work in sync using the same dashboard. It should also be appreciated that the model's outputs can also serve different purposes of further downstream usage.

Figure 2:
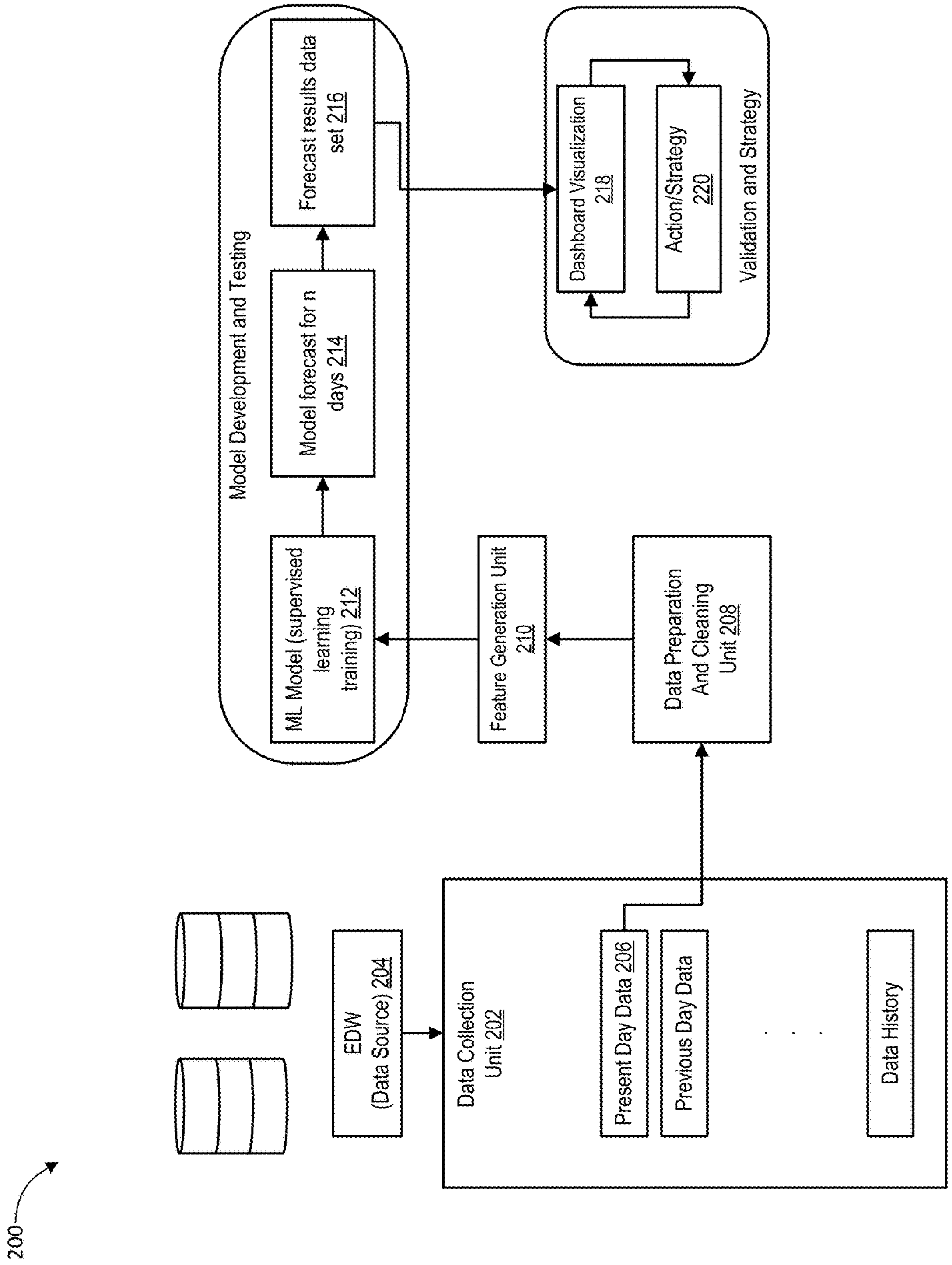
FIG. 2 is an illustration of generating forecasted delays for an enterprise data warehouse, according to one or more embodiments.

FIG. 2 is an illustration 200 of generating forecasted delays for an enterprise data warehouse, according to one or more embodiments. A data collection unit 202 can collect data at a desired frequency from the EDW 204. As illustrated, the data collection unit 202 is configured to collect present day data 206 from the EDW 204 every day. The present day data 206 data can include a time stamp data, a file identifier, a client identifier, and data from other sources, such as a file tracking database (e.g., the file tracking database 106 of FIG. 1). Data received from a client (e.g., the client 102 of FIG. 1) at a data ingestion tool (e.g., the data ingestion tool 104 of FIG. 1), sent in the form of file tracking data, can be merged with the data (e.g., the release tracking data 114 of FIG. 1) further downstream in the EDW (e.g., the EDW 112 of FIG. 1). The data can be formatted to be amendable to feature generation for a model (e.g., a machine learning regression model).

The data collection unit 202 can transmit the data (e.g., the file) to a data preparation and cleaning unit 208. The data preparation and cleaning unit 208 can use the time stamps to determine that have been collected with the desired frequency (e.g., within one day). The data preparation and cleaning unit 208 can further assign each pair client identifier and file identifier a unique identifier. Any unique identifier that is null for more than 90% of the time stamps, can be removed (e.g., the outliers are capped at 90th percentile). The data can be stored in a data structure, such as a table. Therefore, the data preparation and cleaning unit 208 can further rearrange the table columns and rows (e.g., data pivoting), such that each column can represent a time series for forecasting delays corresponding to a unique identifier. The data preparation and cleaning unit 208 can further prepare the data by creating values for missing values, such as by using linear interpolation.

The data preparation and cleaning unit 208 can then transmit the cleaned data to a feature generation unit 210. The feature generation unit 210 can use the cleaned data to generate features. As described above, features can be generated using mathematical and statistical functions such as date features, window features, cumulative features, delay features, binary, and a moving average process. A non-exhaustive list of generated features is described in more particularity with respect to FIG. 4.

The feature generation unit 210 can process the features to generate inputs for a machine learning model 212. The machine learning model 212 can be trained using supervised learning techniques to implement a forecasting technique and forecast a delay expected between a file being received at a data ingestion tool and landing at an EDW. The system can receive tracking data at a desired frequency (e.g., everyday), and therefore the feature generation unit 210 can generate features every day, and the model can be trained every day. The output for the machine learning model can be a model forecast for "d" number of days 214, where "d" is the forecasted delay. For example, based on the features, the machine learning model 212 can output a forecasted number of days between a file being received at a data ingestion tool and landing at an EDW (e.g., 1 day-28 days, etc.). The forecast can be per source, per client. The model can output more than one forecast for a client. For example, if the client has files being received by the data ingestion tool from multiple sources. Each of the forecasts can be included in a forecast results data set 216.

The forecast results data set 216 can be transmitted to a dashboard visualization to be viewed on a display of a computing device, such as a laptop or personal computer. The forecast results data set 216 can also be transmitted to an action and/or strategy unit 220. Based on the results, the computing device can provide an explanation for the delay and either generate a ticket or not generate a ticket for a monitoring team to mitigate the delay. In some instances, the action and/or strategy unit 220 can calculate a confidence score for the forecasted delay. The action and/or strategy unit 220 can further generate a work ticket based on whether the confidence score is greater than a threshold confidence. The threshold confidence can be determined on a daily basis. For example, the accuracy of the model can be calculated each day. The threshold confidence can be based on a percentile of the confidence score of the accuracy of the model.

In some EDW systems, a standard expected delay is three days. If a file has not landed after three days, an EDW operator would wait twenty-four hours after the third day to see if the file has landed before writing a work ticket to have a team attempt to mitigate the daily. The herein-described embodiments permit an EDW to generate a work ticket based on a forecasted delay. Therefore, the herein-described embodiments, can be used to generate a work ticket earlier than the four days (e.g., three days+one day) used by some EDW systems.

Figure 3:
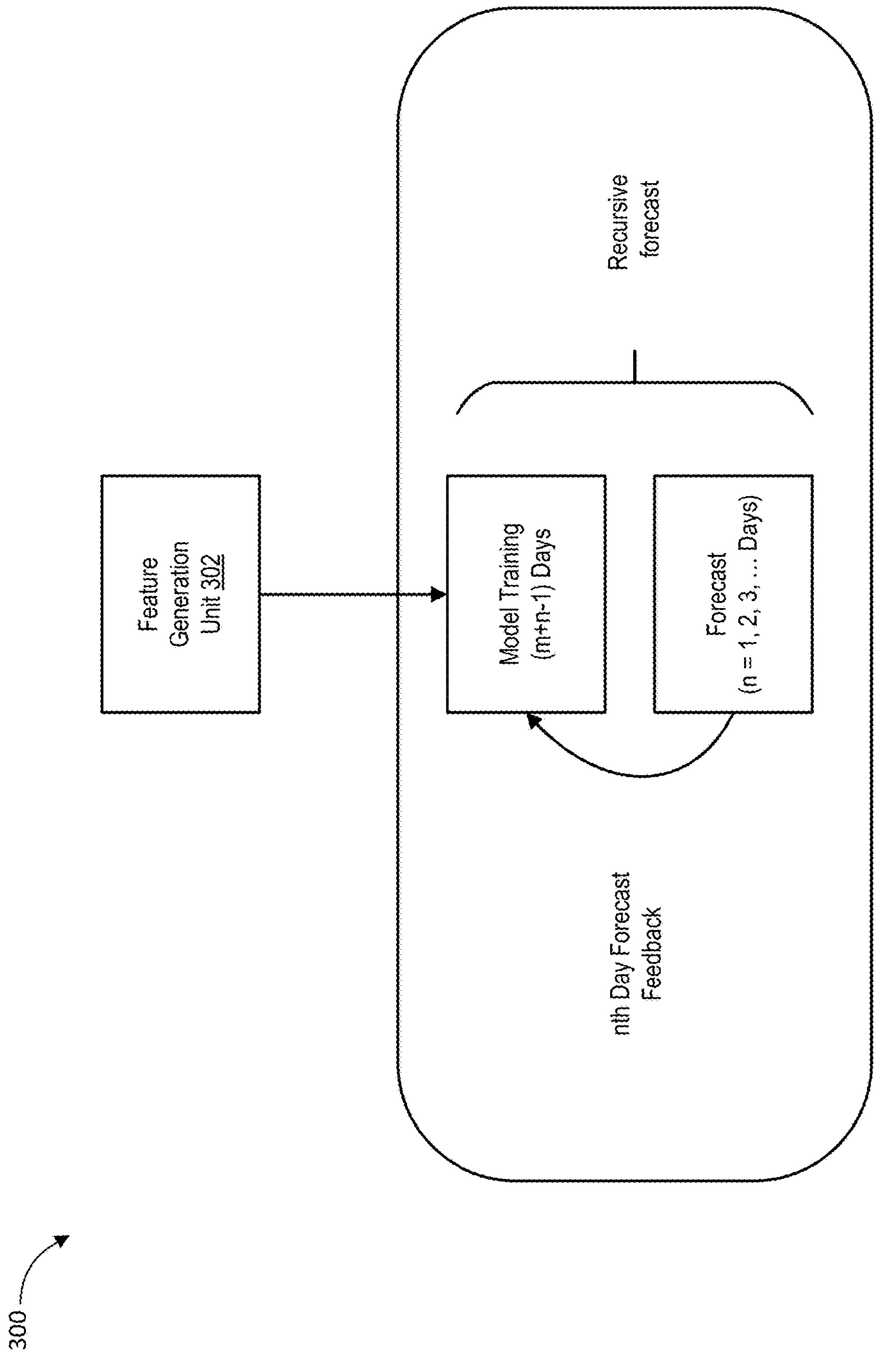
FIG. 3 is an illustration of a model training process, according to one or more embodiments.

FIG. 3 is an illustration 300 of a model training process, according to one or more embodiments. A feature generation unit 302 can receive a time series that includes a number of data points. For simplicity consider ten data points for ten consecutive days (e.g., April 1$^{st}$ through April 10$^{th}$). The "m" can include a portion of the days (e.g., eight days, including April 1$^{st}$ through April 8$^{th}$), and the "n" can include the horizon (e.g., two days, including April 9$^{th}$ and April 10$^{th}$). The machine learning model can be trained using the "m" number of days (e.g., eight days, including April 1 through April 8$^{th}$) to forecast a value for either April 9$^{th}$ or April 10$^{th}$. The actual data from April 9$^{th}$ or April 10$^{th}$ can be used to determine the accuracy of the forecasts. The values for "m" and "n" can continuously be adjusted to recursively generate new forecasts until the accuracy of the forecasts reaches an acceptable threshold.

FIG. 4 is an illustration 400 of features generated by a feature generation unit, according to one or more embodiments. The features are presented in a table format and should not be considered an exhaustive list. The table includes a column for parameter name 402 (e.g., feature name), description 404, an ML model outcome 406, an analysis 408, and a decision 410. For illustration, consider the client_delay_weekly feature 412. According to the description 414, the client_delay_weekly feature 412 can be a comparison of the average delay between clients of the EDW. As illustrated, the model can reach a conclusion of no delay 416. It should be appreciated that the model outcome of no delay 416 is for illustrative purposes only, and the no delay 416 for the client_delay_weekly feature 412 can be a delay based on the actual average delay values. This is true for each of the ML model outcomes displayed on the table. If the ML model outcome is no delay 416, then a cause can be that the average day for the client is below the average delay for other clients. In the event that the client_delay_weekly feature 412 does result in a no delay output, the decision can be "don't raise ticket." As indicated, the table only illustrates the output of no delay 416. If, however, the client_delay_weekly feature 412 resulted in an output of delay, the decision may have been to raise a ticket. In some instances, the analysis 408, the decision 410 and decision 412 can be displayed on a dashboard for an EDW monitoring team to view.

FIG. 5 is an illustration of a confidence metric for a data flow process, according to one or more embodiments. As indicated above, the model can be continuously trained based on a desired frequency (e.g., daily, weekly, monthly). As illustrated, the model can be trained on a daily basis. For example, each day a feature generation unit can receive historical data, such as the last six months of data from the EDW. The last six months of historical data can include, for example, ten thousand data points. The feature generation unit can use the historical data to generate one or more features for the machine learning model, such as by using the above-described 80/20 split. The model can generate one or more forecasted delays using the historical data using the 80% of the historical data (e.g., oldest eight thousand data points) to forecast delays. The model's output (e.g., forecasted delays) can be tested using the 20% of the historical data (e.g., two thousand youngest data points) as a ground truth. Based on the testing, a confidence in the model's accuracy can be determined. As illustrated, on January 1, the overall confidence in the model's accuracy is determined to be 0.95 and on January 2$^{nd}$, the overall confidence in the model's accuracy is determined to be 0.96. These confidence scores are determined for the model as a whole and are not respective to any particular client. The trained model can further be used to forecast a delay for a particular client or client source. As illustrated, on January 1$^{st}$, the model predicted a delay of 1 day for data received from source 1 and at a data ingestion tool on January 1$^{st}$. The confidence in the prediction for delay associated with source 1 at 0.94. A confidence percentile can be determined based on the overall confidence score for January 1$^{st}$. As illustrated, the confidence percentile can be the 90$^{th}$ percentile and above. In other words, the confidence in the forecasted delay for source 1 is to be in the $90^{th}$ percentile or above of the model's overall confidence score. Therefore, for January $1^{st}$, the confidence score for the source 1 forecasted delay is to be 0.855 or above (e.g., 0.95*0.9=0.855). In this case, the confidence in the forecasted source 1 delay is 0.94 and greater than 0.855, and therefore the forecasted delay can be accepted.

For January $2^{nd}$, the source 1 forecasted delay for files received at the data ingestion tool on January $2^{nd}$ is 2 days. The overall confidence score for the model on January $2^{nd}$ is 0.96. The confidence score for the forecasted 2 day delay for source 1 is 0.85. The $90^{th}$ percentile threshold for confidence in model is 0.864 (e.g., 0.96*0.9=0.864). The confidence score for the forecasted 2 day delay on January $2^{nd}$ is 0.85, which is below the $90^{th}$ percentile threshold. Therefore, the EDW operator can reject the model's forecasted delay for January $2^{nd}$. In this scenario, the expected delay can be determined to be a specified expected delay. For example, a client and the EDW can negotiate an expected delay (e.g., three days) between a file being received at a data ingestion tool and the file landing at the EDW. In these instances, the model's forecasted delay is not accepted, the specified expected delay can be used. If the delay extends past the specified expected delay, the EDW operator can wait twenty-four hours to see if the file lands at the EDW, and, if not, the EDW can write a ticket to have monitoring team determine and resolve the issue.

Figure 6:
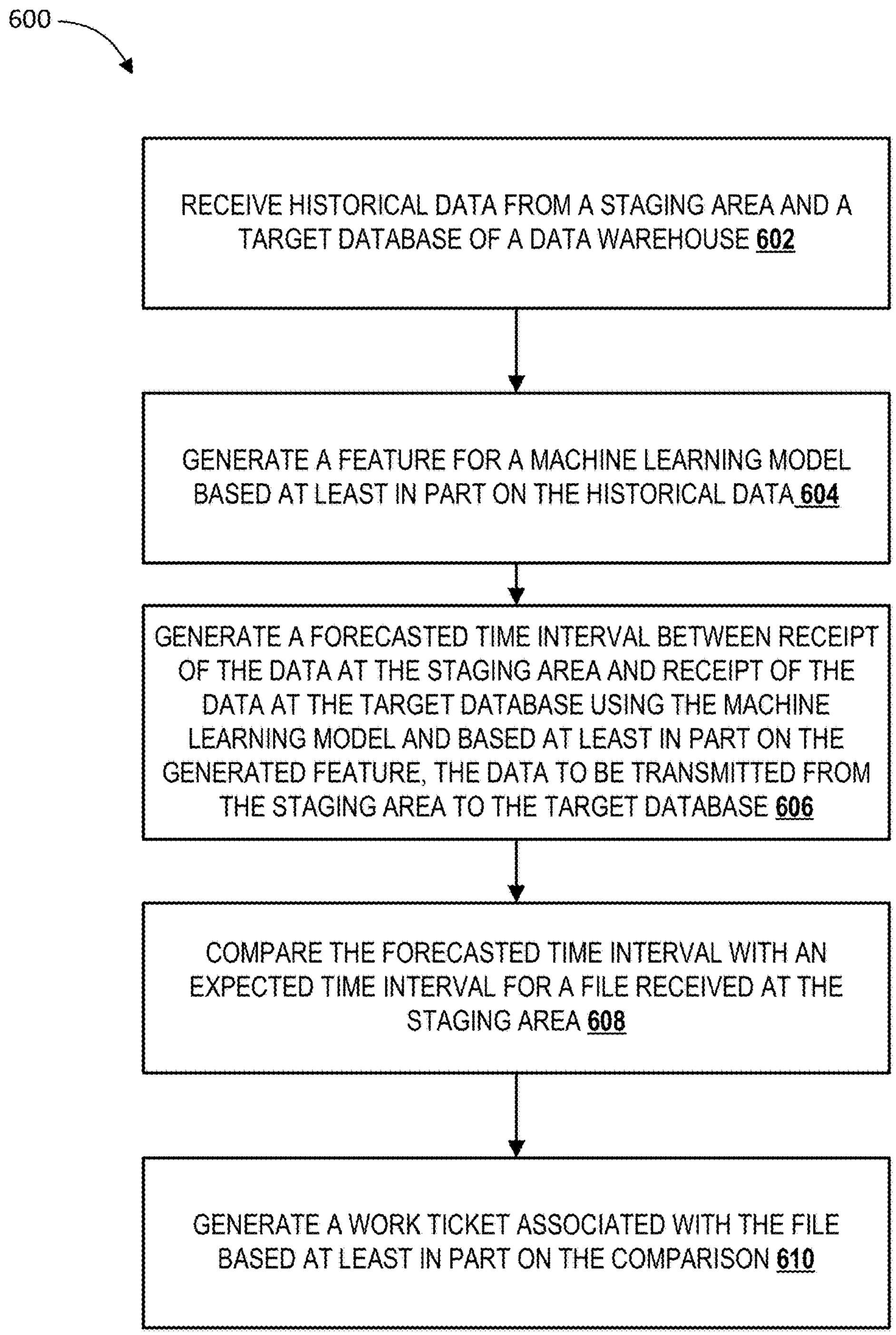
FIG. 6 is a process flow for determining whether to issue a work ticket at an EDW, according to one or more embodiments.

FIG. 6 is a process flow 600 for determining whether to issue a work ticket at an EDW, according to one or more embodiments. While the operations of process 600 is described as being performed by generic computers, any suitable device (e.g., a cloud service provider server) may be used to perform one or more operations of this process. Process 600 (described below) is respectively illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes.

At 602, the method can include a computing device receiving historical data from a staging area and a target database of a data warehouse. The computing device can include, for example, a server of a cloud infrastructure. The historical data can include, for example, past data retrieved from a data ingestion tool of a staging area and data retrieved from a target data warehouse. The data can include a time stamp, a data identifier, and client identifier, where the client is the sender of the data. In some instances, the data can further include a unique identifier generated from two or more pieces of identifying data. The data warehouse can be an enterprise data warehouse (EDW) operated by a cloud service provider (CSP).

At 604, the method can include the computing device generating a feature for a machine learning model based at least in part on the historical data. The computing device can include a feature generation unit for generating features from the historical data. The computing device can generate the features using mathematical and statistical functions such as date features, window features, cumulative features, delay features, binary, and a moving average process. The feature can further be processed to generate inputs for a machine learning model.

At 606, the method can include the computing device generating a forecasted time interval between receipt of the data at the staging area and receipt of the data at the target database using the machine learning model and based at least in part on the generated feature, the data to be transmitted from the staging area to the target database. The forecasted time interval can be a forecasted delay between receipt of the data, from a client, at a data ingestion tool of the staging area to receipt of data at the target database. The data can be sent by the client to the staging area. The data can be processed at the staging area to be amenable to storage at the data warehouse. The data can be transmitted from the staging area and land at the target data warehouse.

In some instances, the generated feature and the historical data are used to train the machine learning model, which can include a forecasting model that uses regression analytics (e.g., a random forest method). For example, the model can be trained every day using a fresh batch of historical data. Each batch of historical data can be identified by a moving window. For example, each batch of historical data can include six months of data preceding the model training date. The historical data can be split into a training set and a testing set. The training set can be used to generate forecasted values for training purposes. The testing set can be used to measure the accuracy of the forecasted values. The entire process of receiving the historical data, training, the model, generating forecasts using the trained model, and making a decision based on the forecasted values can be performed on the same day, each day. In other words, a client can send a file to the be stored at a target database, and on the same day, the system can generate a forecasted delay for the file. If the forecasted delay (e.g., four days) is greater than an expected delay (e.g., a threshold delay of three days agreed upon by the client and the EDW operator), a monitoring team can be deployed to determine a cause for the increased delay and resolve the matter prior to the expiration of the expected delay (e.g., the agreed upon three days).

At 608, the method can include the computing device comparing the forecasted time interval and an expected time interval for a file received at the staging area. The expected time interval can include a default time interval. In some instances, the length of the expected time interval is negotiated by the client and the data warehouse operator (e.g., the cloud service provider). In particular, the computing device can determine an accuracy of the trained model. This accuracy can be agnostic to any particular client. The computing device can further determine a confidence score for the accuracy of the model. The computing device can then determine a threshold value based on a percentile of the confidence score (e.g., a $90^{th}$ percentile). The computing device can use the trained model to generate a forecasted time interval (e.g., forecasted delay) with respect to a particular client and a particular source. The computing device can further determine another confidence score for the forecasted time interval.

The computing device can determine whether the confidence score for the forecasted time interval is greater than or less than the percentile-based threshold. If the confidence score for the forecasted time interval is less than the percentile-based threshold, then the computing device can discard the forecasted time interval and assume the time between the data being received by the data ingestion tool and being received by the target warehouse is the expected time interval. In this instance, the EDW operator can wait for the expiration of the expected time interval (e.g., three days). If the data from the client has not landed at the target database, the EDW operator can wait an additional twenty-four hours to see if the data lands at the target database. If the data lands at the target database, the EDW operator can take no further action. If the data has not landed at the target database, the EDW operator can generate a work ticket to initiate a monitoring team to investigate. If the confidence score for the forecasted time interval is greater than the percentile-based threshold (e.g., threshold confidence score), the computing device can compare the forecasted time interval to the expected time interval.

At 610, the method can include the computing device generating a work ticket associated with the file based at least in part on the comparison. For example, If the confidence score for the forecasted time interval is greater than the percentile-based threshold, the computing device can compare the forecasted time interval to the expected time interval. If the forecasted time interval is less than the expected time interval, the EDW operator can take no further action. If the forecasted time interval is greater than the expected time interval, the EDW operator can generate a work ticket to initiate a monitoring team to investigate whether to delay in processing the file can be rectified.

It should be appreciated that the method includes a visual component, such that machine learning model output, indication of delay, suggested cause of delay can be displayed on a dashboard. For example, any one or more rows of the table illustrated in FIG. 4 can be displayed on the dashboard. Therefore, even though the process is an automated process, an EDW operator can see the process of determining a delay at the EDW As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
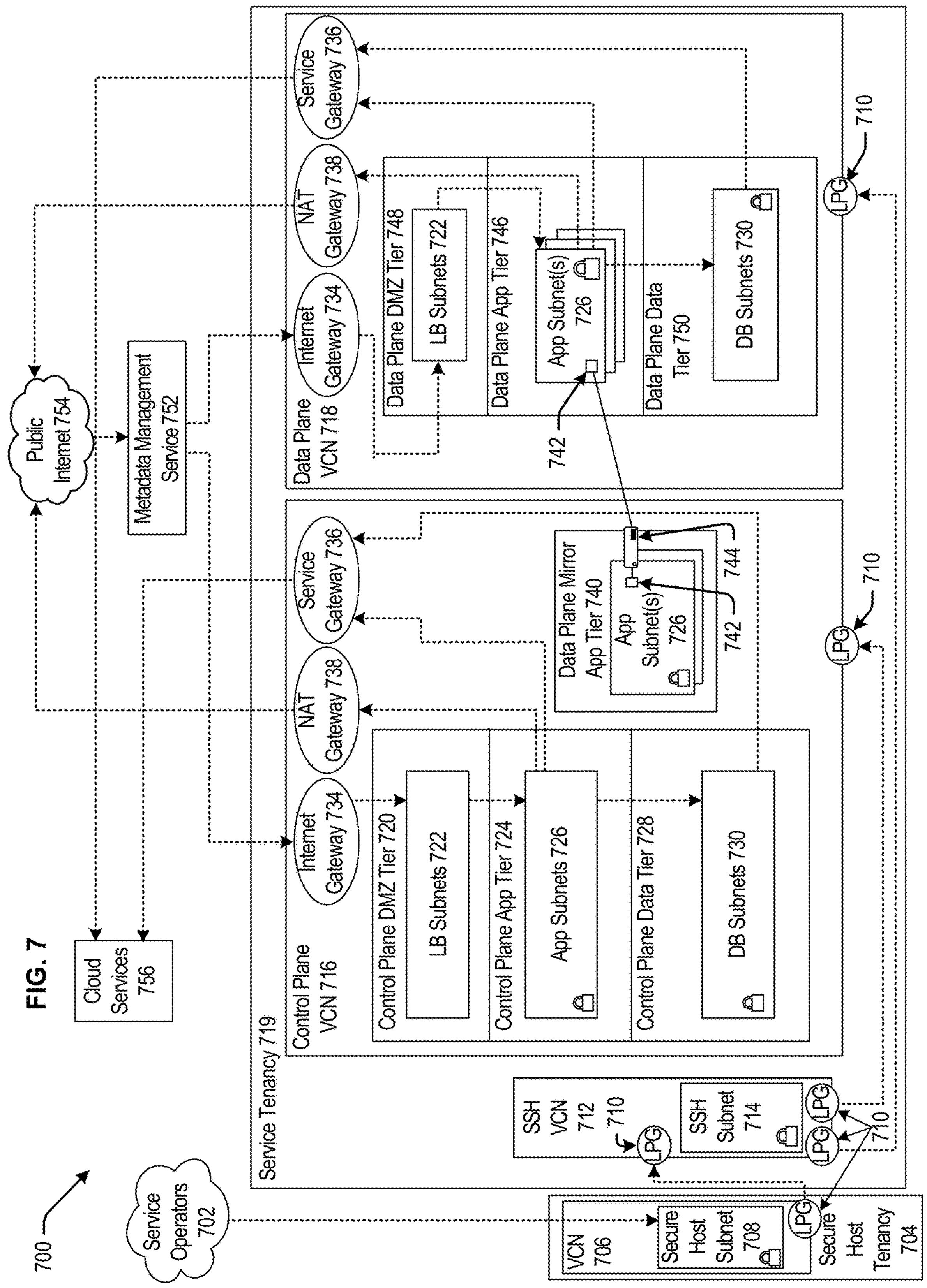
FIG. 7 is a block diagram illustrating one pattern for implementing a cloud infrastructure as a service system, according to one or more embodiments.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
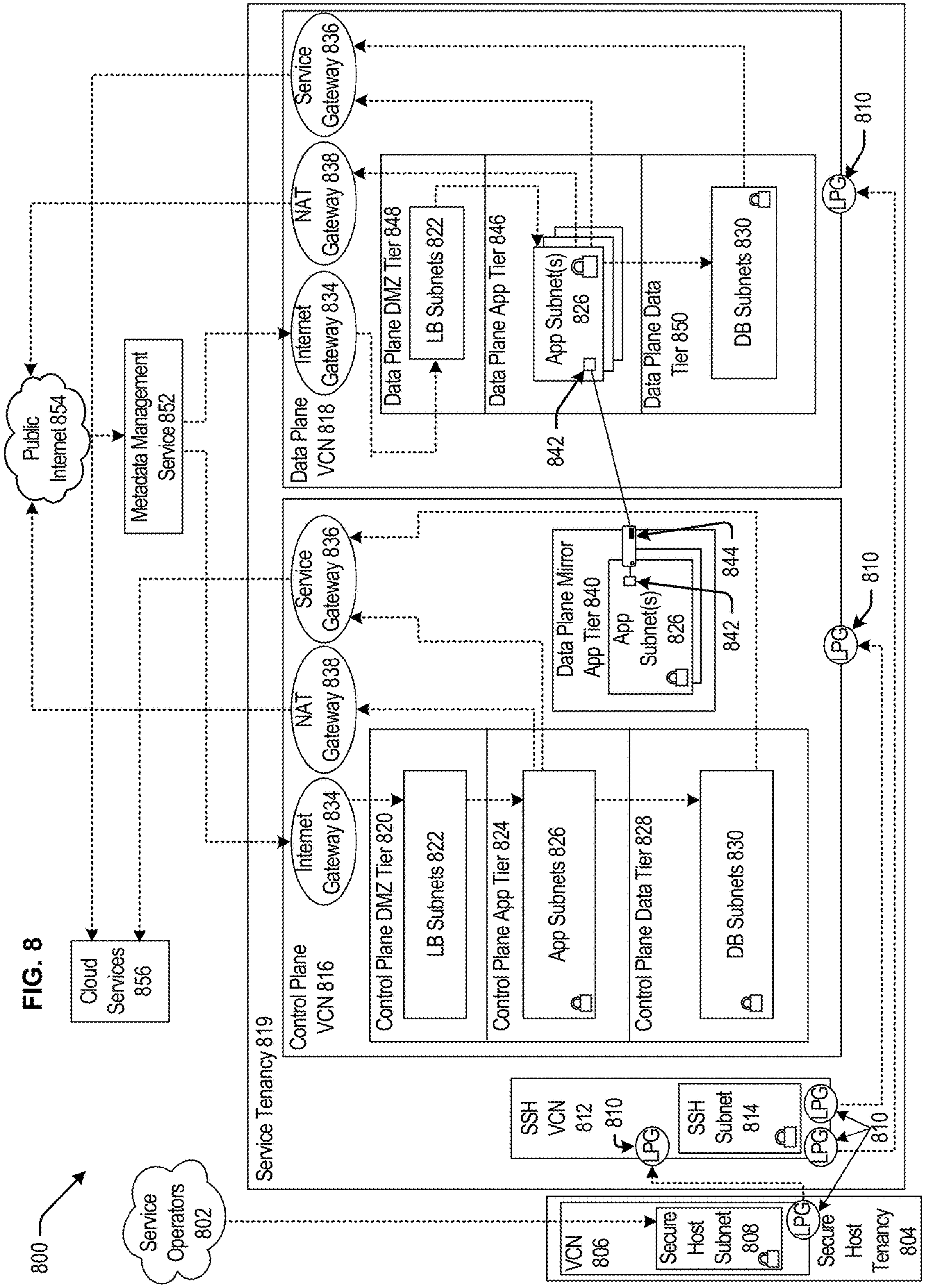
FIG. 8 is a block diagram illustrating another pattern for implementing a cloud infrastructure as a service system, according to one or more embodiments.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
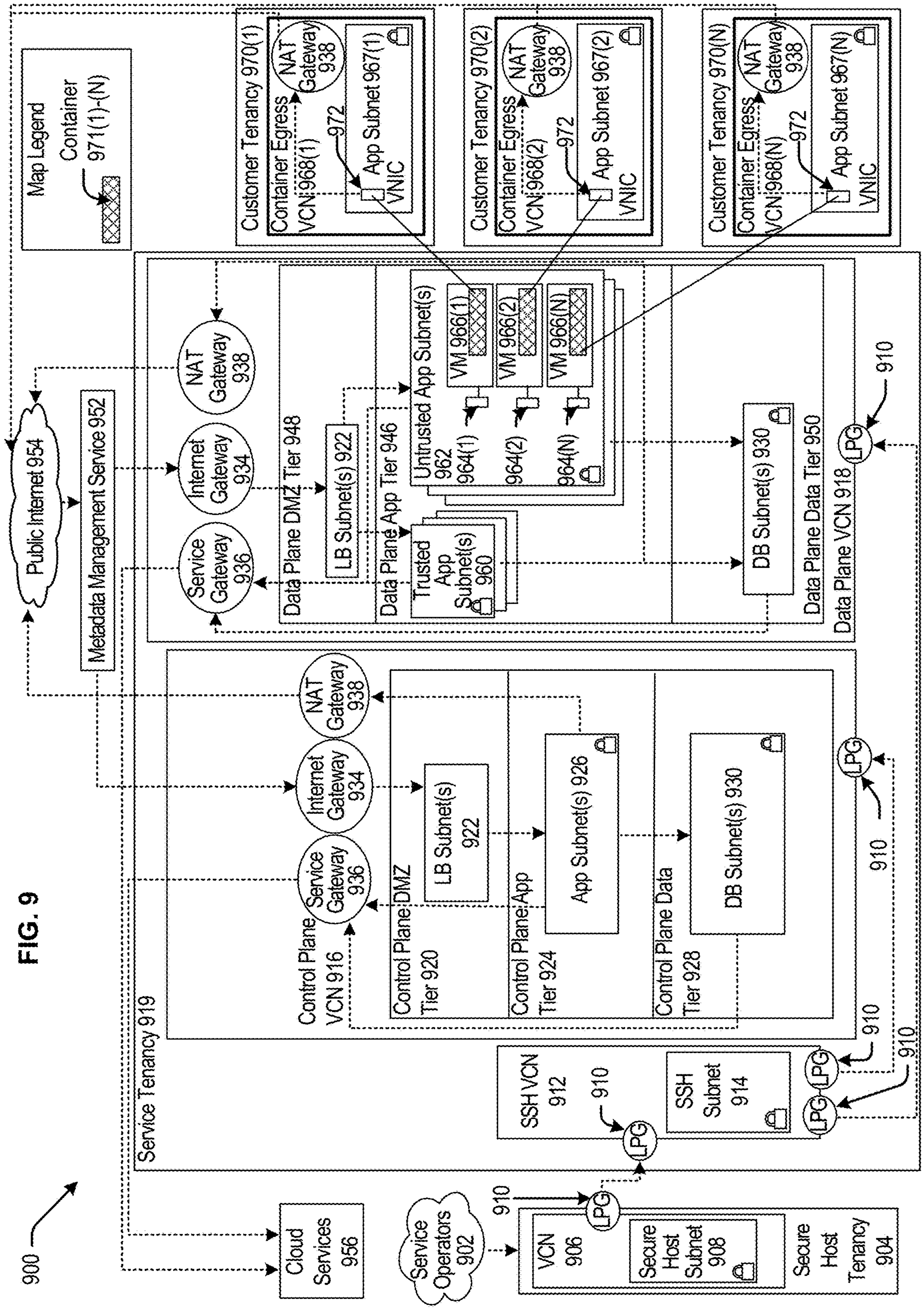
FIG. 9 is a block diagram illustrating another pattern for implementing a cloud infrastructure as a service system, according to one or more embodiments.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
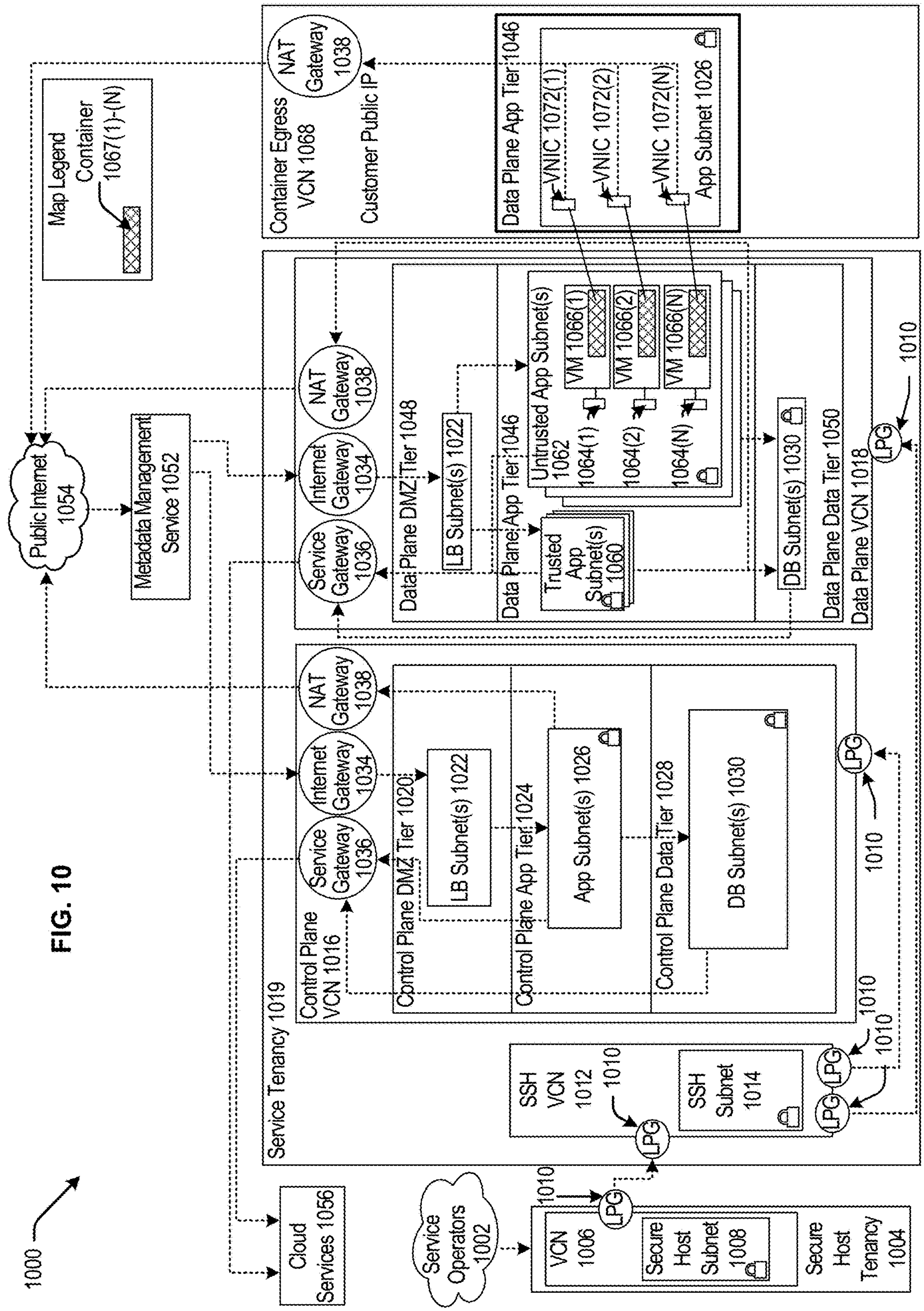
FIG. 10 is a block diagram illustrating another pattern for implementing a cloud infrastructure as a service system, according to one or more embodiments.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
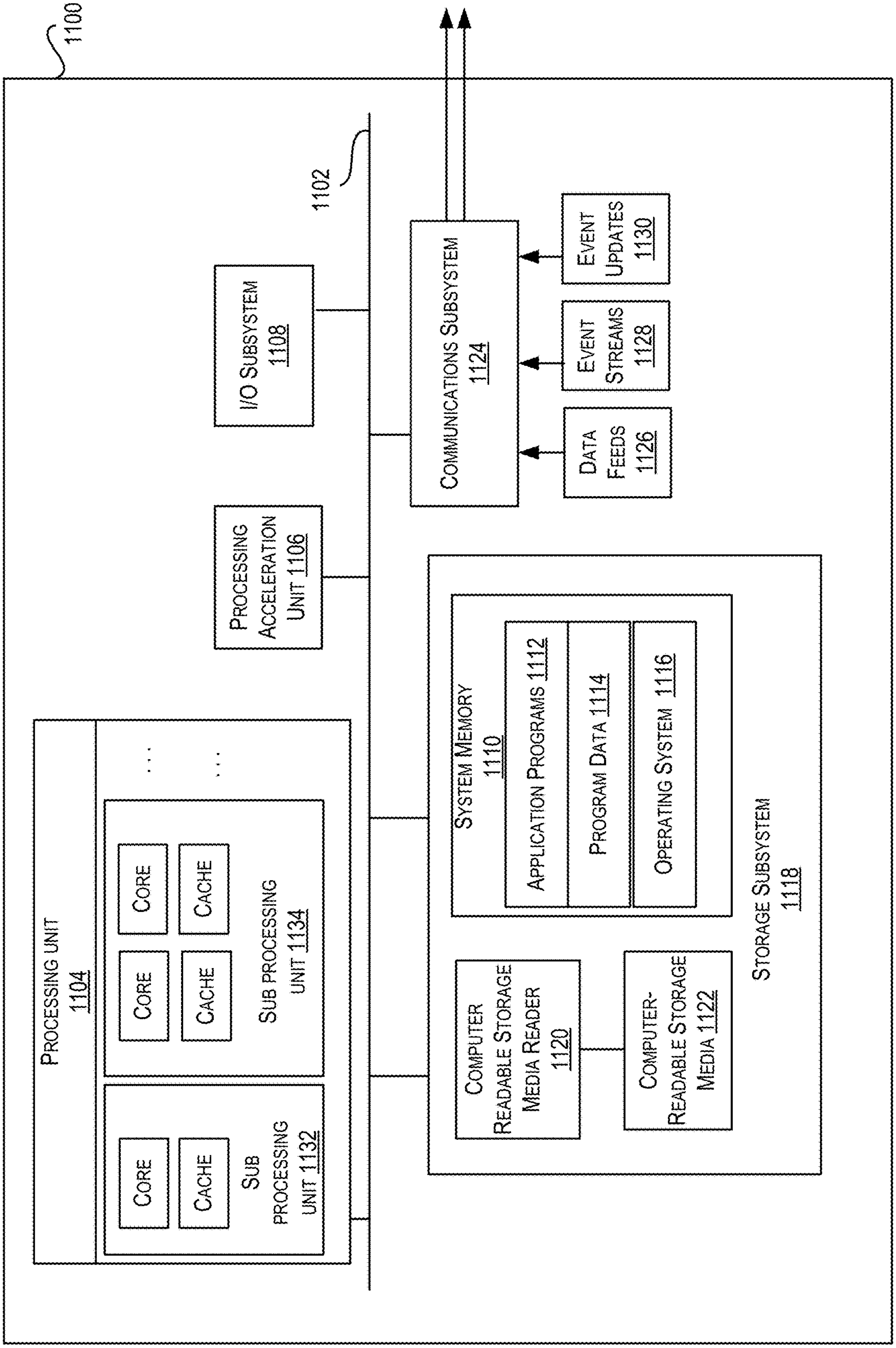
FIG. 11 is a block diagram illustrating an example computer system, according to one or more embodiments.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program services that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1118 may also provide a tangible computer-readable storage medium for storing the basic programming and data constructs that provide the functionality of some embodiments. Software (programs, code services, instructions) that when executed by a processor provide the functionality described above may be stored in storage subsystem 1118. These software services or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:

generating, by a computing system, a feature for a machine learning model to use to forecast a time interval between receipt of first data at a staging area of a data warehouse and receipt of the first data at a target database of the data warehouse based at least in part on second data received from the staging area and third data received from the target database;

generating, by the computing system and using the machine learning model, a forecasted time interval based at least in part on the feature, the forecasted time interval forecasting the time interval between receipt of the first data at the staging area of the data warehouse and receipt of the first data at the target database of the data warehouse;

calculating, by the computing system, a first confidence score indicating an accuracy of the forecasted time interval;

calculating dynamically, by the computing system, a second confidence score for the accuracy of forecasted time interval, the second confidence score being calculated periodically, the second confidence score indicating an expected time interval;

comparing, by the computing system, the first confidence score with the second confidence score; and generating, by the computing system, a work ticket for mitigating the forecasted time interval based at least in a part on the comparison of the first confidence score with the second confidence score.

2. The method of claim 1, wherein the first data is associated with a first source, wherein the second data is associated with a second source, wherein the first source and the second source are associated with a same account, and wherein the forecasted time interval is based at least in part on the first data and the second data.

3. The method of claim 1, wherein the computing system periodically receives historical data, wherein the historical data comprises first data, and wherein the machine learning model is periodically trained based on a periodicity of receiving the historical data.

4. The method of claim 1, wherein the calculating the second confidence score is based at least in part on a percentile of the first confidence score.

5. The method of claim 1, wherein the first data is associated with a first source, wherein the second data is associated with a second source, wherein the first source and the second source are associated with a same account, wherein the forecasted time interval is a first forecasted time interval, and wherein the method further comprises:

generating a second forecasted time interval associated with the second data; and comparing the second forecasted time interval to the expected time interval.

6. The method of claim 1, wherein the data warehouse is an enterprise data warehouse.

7. A computing system, comprising:

one or more processors; and one or more computer-readable media including instructions that, when executed, cause the computing system to:

generate a feature for a machine learning model to use to forecast a time interval between receipt of first data at a staging area of a data warehouse and receipt of the first data at a target database of the data warehouse based at least in part on second data received from the staging area and third data received from the target database;

generate using the machine learning model, a forecasted time interval based at least in part on the feature, the forecasted time interval forecasting the time interval between receipt of the first data at the staging area of the data warehouse and receipt of the first data at the target database of the data warehouse;

calculate a first confidence score for an accuracy of the forecasted time interval;

calculate dynamically a second confidence score for the accuracy of forecasted time interval, the second confidence score being calculated periodically, the second confidence score indicating an expected time interval;

compare the first confidence score with the second confidence score; and generate a work ticket for mitigating the forecasted time interval based at least in a part on the comparison of the first confidence score with the second confidence score.

8. The computing system of claim 7, wherein the first data is associated with a first source, wherein the second data is associated with a second source, wherein the first source and the second source are associated with a same account, and wherein the forecasted time interval is based at least in part on the first data and the second data.

9. The computing system of claim 7, wherein the computing system periodically receives historical data, wherein the historical data comprises first data, and wherein the machine learning model is periodically trained based on a periodicity of receiving the historical data.

10. The computing system of claim 7, wherein the calculating the second confidence score is based at least in part on a percentile of the first confidence score.

11. The computing system of claim 7, wherein the first data is associated with a first source, wherein the second data is associated with a second source, wherein the first source and the second source are associated with a same account, wherein the forecasted time interval is a first forecasted time interval, and wherein the instructions that, when executed, further cause the computing system to:

generate a second forecasted time interval associated with the second data; and compare the second forecasted time interval to the expected time interval.

12. The computing system of claim 7, wherein the data warehouse is an enterprise data warehouse.

13. One or more non-transitory computer-readable media having stored thereon a sequence of instructions that, when executed, cause a computing system to:

generate a feature for a machine learning model to use to forecast a time interval between receipt of first data at a staging area of a data warehouse and receipt of the first data at a target database of the data warehouse based at least in part on second data received from the staging area and third data received from the target database;

generate using the machine learning model, a forecasted time interval based at least in part on the feature, the forecasted time interval forecasting the time interval between receipt of the first data at the staging area of the data warehouse and receipt of the first data at the target database of the data warehouse;

calculate a first confidence score for an accuracy of the forecasted time interval;

calculate dynamically a second confidence score for the accuracy of forecasted time interval, the second confidence score being calculated periodically, the second confidence score indicating an expected time interval;

compare the first confidence score with the second confidence score; and generate a work ticket for mitigating the forecasted time interval based at least in a part on the comparison of the first confidence score with the second confidence score.

14. The one or more non-transitory computer-readable media of claim 13, wherein the first data is associated with a first source, wherein the second data is associated with a second source, wherein the first source and the second source are associated with a same account, and wherein the forecasted time interval is based at least in part on the first data and the second data.

15. The one or more non-transitory computer-readable media of claim 13, wherein the computing system periodically receives historical data, wherein the historical data comprises first data, and wherein the machine learning model is periodically trained based on a periodicity of receiving the historical data.

16. The one or more non-transitory computer-readable media of claim 13, wherein the calculating the second confidence score is based at least in part on a percentile of the first confidence score.

17. The one or more non-transitory computer-readable media of claim 13, wherein the first data is associated with a first source, wherein the second data is associated with a second source, wherein the first source and the second source are associated with a same account, wherein the forecasted time interval is a first forecasted time interval, and wherein the instructions that, when executed, further cause the computing system to:

generate a second forecasted time interval associated with the second data; and compare the second forecasted time interval to the expected time interval.

* * * * *